Figure 1:
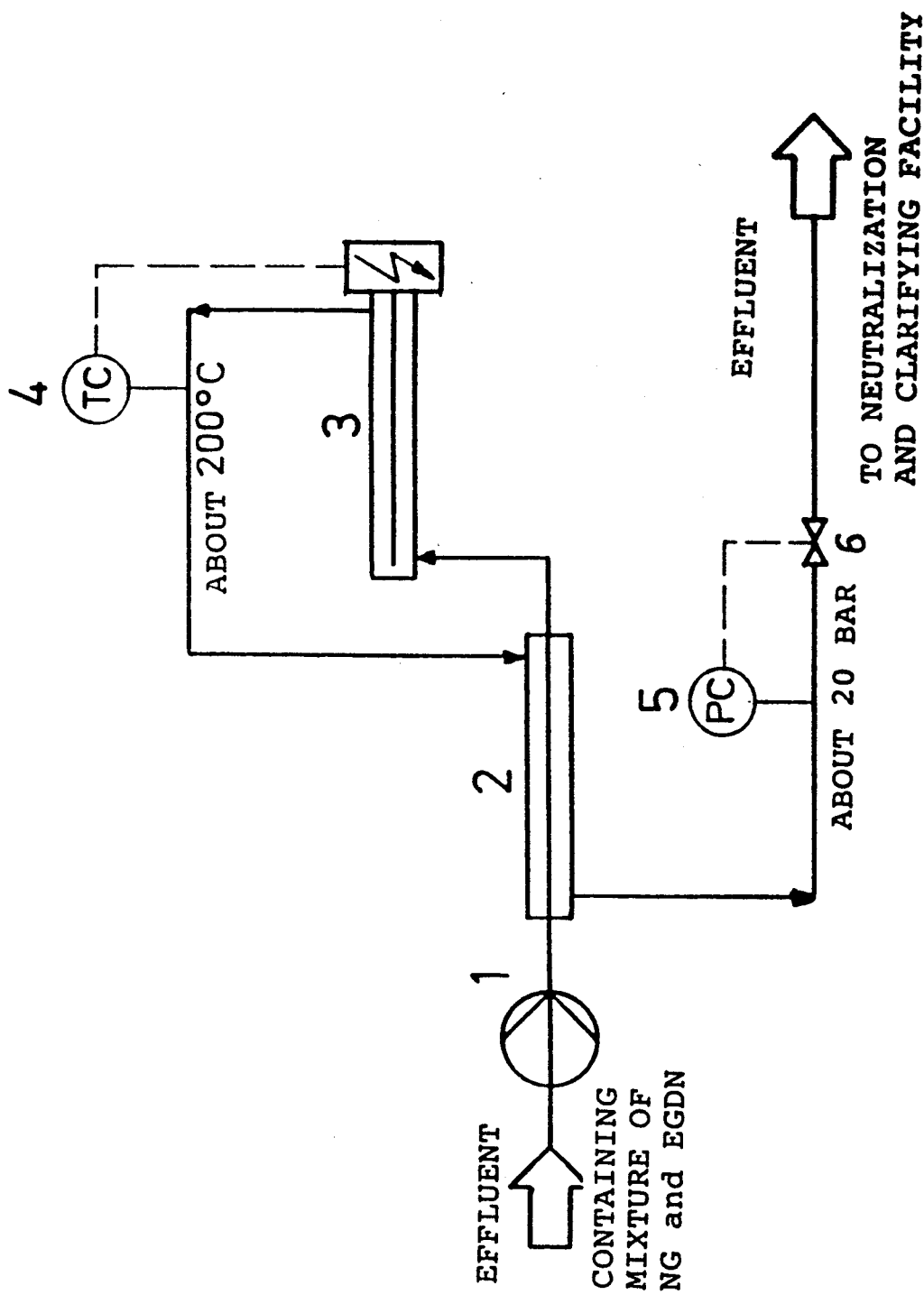

United States Patent [19]

Gresser et al.

[11] Patent Number: 5,011,614
[45] Date of Patent: Apr. 30, 1991

[54] PROCESS FOR THE DECOMPOSITION OF EXPLOSIVE NITRIC ACID ESTERS DISSOLVED IN WASTEWATERS

[75] Inventors: Wilhelm Gresser, Ludinghausen; Klaus Schelhase, Troisdorf-kriegdorf; Heinz Frisch, Haiger-Allendorf; Klaus Kaschel, Cologne; Berent Reinecke; Wilhelm H. Trautmann, both of Burbach, all of Fed. Rep. of Germany

[73] Assignee: Dynamit Nobel AG, Troisdorf, Fed. Rep. of Germany

[21] Appl. No.: 340,685

[22] Filed: Apr. 20, 1989

[30] Foreign Application Priority Data

Apr. 20, 1988 [DE] Fed. Rep. of Germany ....... 3813184

[51] Int. Cl.$^5$ .................. C02F 1/72; C06B 21/00
[52] U.S. Cl. ..................... 210/761; 149/88; 149/101; 149/124; 210/774; 210/903; 210/908
[58] Field of Search .................. 149/88, 101, 124; 210/774, 761, 908, 903

[56] References Cited

U.S. PATENT DOCUMENTS

| | | | |
|---|---|---|---|
| 3,595,742 | 7/1971 | Hess et al. | 210/774 |
| 3,642,620 | 2/1972 | Cole et al. | 210/761 |
| 3,778,320 | 12/1973 | Yosim et al. | 149/124 |
| 4,018,676 | 4/1977 | Hoffsommer et al. | 149/124 |
| 4,066,835 | 1/1978 | Hahn et al. | 210/774 |
| 4,125,445 | 11/1978 | Hurky | 204/149 |
| 4,159,945 | 7/1979 | Savage | 210/610 |
| 4,231,822 | 11/1980 | Roth | 149/124 |
| 4,266,601 | 5/1981 | Jenkins | 165/94 |
| 4,338,199 | 7/1982 | Modell | 210/761 |
| 4,415,456 | 11/1983 | Chandler | 210/673 |
| 4,604,214 | 8/1986 | Carr et al. | 210/759 |
| 4,657,681 | 4/1987 | Hughes et al. | 210/774 |
| 4,661,179 | 4/1987 | Hunter et al. | 149/124 |
| 4,713,232 | 12/1987 | Chin et al. | 149/124 |

Primary Examiner—Edward A. Miller
Attorney, Agent, or Firm—Antonelli, Terry, Stout & Kraus

[57] ABSTRACT

A process for effecting thermal decomposition of explosive nitric acid esters in wastewater effluents of the explosives industry wherein no additional by-products are produced and wherein the danger of explosions is avoided. In this process, the dissolved esters are exposed to a temperature of between 150° and 300° C. under pressure lying above the boiling pressure of the wastewater. During this step, the nitric acid esters are completely decomposed, and the wastewater treated in this way can then be passed on to further processing and purification. In a preferred embodiment, the hot wastewater exiting from a decomposer unit is exploited for preheating the effluent before it enters the decomposer unit.

19 Claims, 1 Drawing Sheet

PROCESS FOR THE DECOMPOSITION OF EXPLOSIVE NITRIC ACID ESTERS DISSOLVED IN WASTEWATERS

The present invention relates to a process for the decomposition of explosive nitric acid esters which are dissolved in wastewaters and which are not degradable into compounds that are biodegradable.

During the manufacture of explosives and, in particular, during the production of the nitric acid esters utilized in explosives, wastewaters result which contain these nitric acid esters in dissolved form. Since the nitric acid esters, even at low concentrations, exhibit bacterial as well as fish toxicity, removal of these compounds is necessary even before they are introduced into biological purification facilities or into drainage ditches.

It is known to remove the nitric acid esters by extraction (cf. DOS 2,623,107). In this process, residues of the extractant remain, however, in the wastewater, and quantitative separation is impossible so that after this treatment an additional waste removal is still necessary in all cases.

It is furthermore known to decompose nitric acid esters by saponification and, in this way, purify wastewaters containing these esters. This takes place generally at an elevated temperature and at a high pH value in the presence of an alkaline medium. Disadvantages in this process reside in the high energy expenditure required and in the thus-produced high loads of salt obtained during subsequent neutralization.

Therefore, the object resides in decomposing the nitric acid esters contained in dissolved form in effluents from the explosive manufacture in a process having a maximally quantitative effect wherein no additional by-products are obtained and which can be performed at minimum energy cost. Furthermore, the process to be provided must ensure that no explosions occur due to the thermal instability of the nitric acid esters.

In meeting this objective, a process has now been found for the decomposition of explosive nitric acid esters dissolved in wastewaters and not being biodegradable which is characterized by heating the esters dissolved in the water under elevated pressure in the liquid phase to temperatures of between 150° and 300° C., preferably between 180° and 250° C.

With the use of this procedure, the nitric acid esters dissolved in the wastewater are split practically quantitatively into organic fragments (e.g. oxidation products of the alcohol, including $CO_2$) which are no longer toxic and which can be degraded in a biological treatment facility. The nitric acid esters can no longer be detected in the wastewaters purified according to this invention, i.e. the concentration of these esters lies below 10 ppm. In spite of the relatively high temperatures at which the pure nitric acid esters will already react with detonation, no explosions occur in the described mode of performing the process.

It is essential to the invention that the nitric acid esters be present in dissolved form in the wastewaters to be treated. The respective concentration depends on the solubility of the respective nitric acid esters and the presence of the other inert materials in the wastewater. In general, solutions are utilized which are saturated with the nitric acid esters. However, it is also possible, but less preferred, to process wastewaters with lower concentration of nitric acid esters in accordance with the invention.

The thermal load is exerted on the wastewater under pressure; the pressure must be so high that it lies above the boiling pressure (vapor pressure) of the wastewater so that the wastewater remains liquid during the high-temperature treatment. The pressure to be utilized, to which the wastewater must be raised prior to thermal load application, depends on the selected operating temperature. In case of a high-temperature treatment of about 200° C., a pressure of about 20 bar is suitably employed. At temperatures of about 300° C., the pressure to be used must be over 90 bars.

Decomposition of the nitric acid esters under the conditions according to this invention proceeds very quickly. The residence times in the heretofore described temperature range thus can be very brief so that even with residence time of 1 minute complete decomposition occurs. With a continuous mode of operation, it is thus possible to process large quantities of wastewater, e.g. 2,000 liters of wastewater or more, in accordance with this invention.

The wastewaters processed according to the invention are generally acidic solutions, the pH of which fluctuates between 1 and 4. The process according to this invention can be performed with wastewaters having a pH of below 7. Also neutral solutions can be processed according to the invention.

The nitric acid esters decomposed in accordance with the invention ar primarily the nitric acid esters of glycerol and of ethylene glycol. The term "nitric acid esters", however, is meant also to cover the corresponding esters of monohydric or polyhydric alcohols utilized in mixtures of explosives, e.g. esters of diethylene- and triethyleneglycol. Examples that can be cited are diethyleneglycoldinitrate (DEGDN), butyl nitrate or butanetriol trinitrate. Mixtures of the aforementioned ester compounds can likewise be processed in accordance with this invention.

The process of this invention can be performed continuously as well as discontinuously. The procedure in a continuous mode of operation is preferably to utilize the decomposed, still hot wastewater for preheating the wastewater to be treated. In this way, the energy used for decomposition can be optimally exploited.

The process of the invention is illustrated by the sole diagram in the sole FIGURE of the accompanying drawings (FIG. 1).

The flow diagram of FIG. 1 illustrates the present invention in one embodiment. A sulfuric and nitric aqueous effluent, i.e. a wastewater, from the manufacture of explosives, containing ethylene glycol dinitrate (EGDN) and glycerol trinitrate (NG) in dissolved form is brought continuously by means of the pump 1 to a pressure of about 20 bar. This elevated pressure lies above the boiling pressure of the wastewater in order to avoid vaporization of the effluent during the subsequent heating step and thereby maintain the effluent in the liquid state.

The effluent flows at a flowrate between about 0.2 and 2 m/s through a high-power heat exchanger 2 where it is heated by transfer of heat from the fluid afflux from the heater 3 to 190° to 195° C., into the subsequently arranged heater 3 wherein it is brought to the final temperature of about 200° C. by electric heating elements. In heater or decomposer unit 3, the mixture of EGDN and NG is completely decomposed. In this decomposer unit no baffles are used so that the residence time there amounts to only a few seconds. By means of controller 4, the temperature is maintained constant at the indicated value, and by means of controller 5, the pressure is maintained constant at the value indicated.

The thus-treated water thereafter passes through the heat exchanger 2 wherein it is cooled to room temperature. No nitric acid esters could be detected in this water, and the main impurities it contains are oxidation products of glycols. After expansion at the pressure regulating valve 6, the water is introduced for further purification into a neutralizing and clarification facility where neutralization and subsequently thereto biological degradation of the thermal decomposition products are carried out.

What is claimed is:

1. A process for the decomposition of explosive nitric acid esters dissolved in wastewaters obtained from the manufacture of explosives and not being biodegradable, which comprises heating the wastewater containing the nitric acid esters dissolved therein, while maintaining the wastewater under pressure and in the liquid phase, to temperatures of between 150° C. and 300° C. to decompose the nitric acid esters without explosion.

2. A process according to claim 1, wherein the wastewater containing the dissolved nitric acid esters is heated to temperatures in the range of from 180° C. to 250° C.

3. A process according to claim 1, wherein, in a continuous mode of performing the process, the heated wastewater containing the decomposition products of the nitric acid esters yields its heat to the wastewater to be heated by passing through a heat exchanger.

4. A process according to claim 1, wherein the explosive nitric acid esters comprise nitric acid esters of monohydric and polyhydric alcohols.

5. A process according to claim 1, wherein the nitric acid esters comprise at least one of the nitric acid esters of glycerol, ethylene glycol, diethylene glycol, triethylene glycol and butyl alcohol.

6. A process according to claim 1, wherein the wastewater containing the explosive nitric acid esters dissolved therein has a pH of less than 7.

7. A process according to claim 1, wherein the wastewater containing the explosive nitric acid esters dissolved therein has a pH in the range of 1 to 4.

8. A process for the decomposition of explosive nitric acid esters of monohydric and polyhydric alcohols dissolved in a wastewater obtained from the manufacture of explosives, said esters not being biodegradable, which comprises heating wastewater containing the explosive nitric acid esters dissolved therein, while maintaining the wastewater under elevated pressure sufficient to maintain the wastewater in a liquid phase, to temperatures between 150° and 300° C. to effect decomposition of the nitric acid esters under such conditions that no explosion occurs due to the thermal instability of the nitric acid esters.

9. A process according to claim 8, wherein the wastewater containing the dissolved nitric acid esters is heated to temperatures in the range of from 180° to 250° C.

10. A process according to claim 8, wherein, in a continuous mode of performing the process, the heated wastewater containing the decomposition products of the nitric acid esters yields its heat to the wastewater to be heated by passing through a tubular heat exchanger.

11. A process according to claim 8, wherein the nitric acid esters comprise at least one of the nitric acid esters of glycerol, ethylene glycol, diethylene glycol, triethylene glycol and butyl alcohol.

12. A process according to claim 8, wherein the wastewater containing explosive nitric acid esters dissolved therein has a pH of less than 7.

13. A process according to claim 8, wherein the wastewater containing the explosive nitric acid esters dissolved therein has a pH in the range of from 1 to 4.

14. A process according to claim 8, wherein during heating of said wastewater, the nitric acid esters are converted into organic fragments which can be biodegraded.

15. A process according to claim 8, wherein the wastewater comprises a solution saturated with the nitric acid esters.

16. A process according to claim 8, wherein the elevated pressure is on the order of at least 20 bar.

17. A process according to claim 8, wherein the concentration of nitric acid esters remaining in the wastewater after heating to effect decomposition lies below 10 ppm.

18. A process according to claim 8, wherein the wastewater contains the nitric acid esters in low, but toxic concentrations, so that the nitric acid esters must be removed before the wastewater is subjected to biological purification or discharge to a drainage ditch.

19. A process according to claim 8, wherein the wastewater containing the nitric acid esters dissolve therein is initially passed through a pump to obtain said elevated pressure and then heated to the temperatures between 150° and 300° C.

* * * * *